Patented Feb. 10, 1931

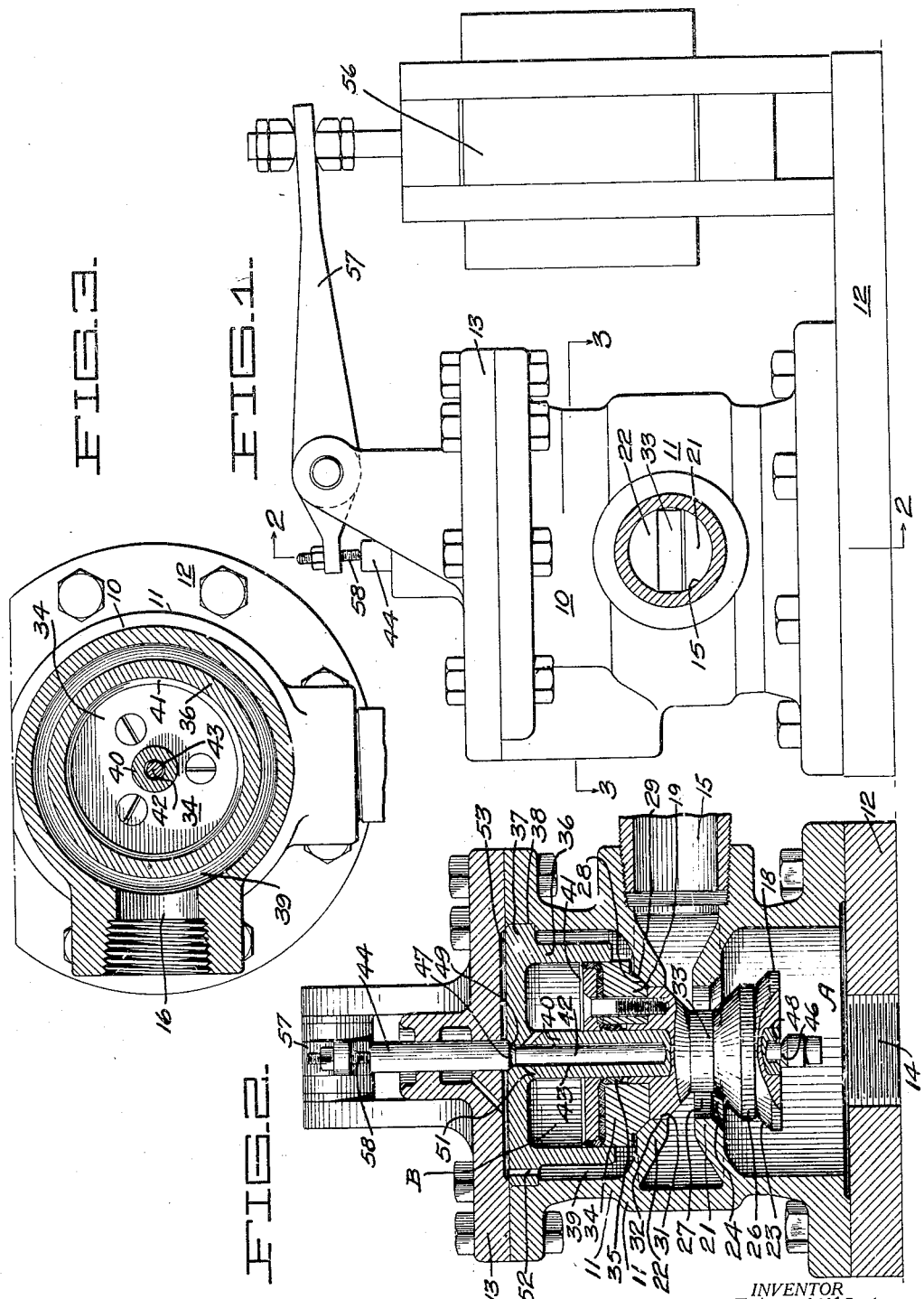

1,791,570

UNITED STATES PATENT OFFICE

ERNEST W. ORTON, OF MOUNTAIN VIEW, AND CHARLES V. FOULDS, OF BERKELEY, CALIFORNIA, ASSIGNORS TO THE PELTON WATER WHEEL COMPANY, OF SAN FRANCISCO, CALIFORNIA, A CORPORATION OF CALIFORNIA

FLUID-OPERATED VALVE

Application filed July 30, 1927. Serial No. 209,498.

This invention relates generally to valves for controlling the flow of fluids, and has special application to valves of the type in which the valve members are actuated by fluid pressure.

It is an object of this invention to devise a novel three way valve in which the movable valve members are actuated by the pressure of fluid within the system being controlled.

It is a further object of this invention to devise a novel form of valve capable of three-way control of fluid flow, in which the movable parts thereof are controlled by suitable pilot means.

It is a further object of this invention to actuate the valve members of a three way valve by a novel form of differential area piston.

It is a further object of this invention to devise a three way valve having a pair of movable valve members, in which the valve members are associated with means serving to prevent flow of fluid between the high and low pressure housing passages, while the valve members are in an intermediate position.

It is a further object of this invention to generally improve upon the construction of fluid operated valves whereby they are rendered particularly applicable for control by electrical magnetic devices.

It is a further object of this invention to devise a fluid operated valve of simple mechanical construction and which will not readily get out of order.

Further objects of this invention will appear from the following description in which we have set forth the preferred embodiment of our invention. It is to be understood that the appended claims are to be accorded a range of equivalents consistent with the state of the prior art.

Referring to the drawing:

Figure 1 is a side elevational view showing the valve of this invention incorporated in combination with a magnetic solenoid for controlling the same.

Fig. 2 is a cross sectional view taken along the line 2—2 of Fig. 1.

Fig. 3 is a cross sectional view taken along the line 3—3 of Fig. 1.

The invention may be defined briefly as comprising a valve housing having a plurality of passageways for ingress and discharge of fluids. As it is particularly designed for three-way control three passages are provided for external connections, one passage being adapted to be connected to a source of fluid under pressure. A pair of valve members are disposed within the housing, and these valve members are adapted to be simultaneously actuated by means of a fluid operated piston or plunger. In one position of the valve members fluid is permitted to flow from the first passage to the second, while in the other position fluid may flow from the second passage to the third to the exclusion of the first passage. The plunger is provided with opposed differential areas and the fluid pressures applied to these areas are controlled by a pilot valve. As this pilot valve requires little power for its operation, it may be readily actuated externally of the valve housing by means of an electrical solenoid.

Referring to the drawing for a more complete description there is shown a valve housing 10, consisting for example of an intermediate portion 11, and end portions 12 and 13 bolted or otherwise removably secured to the portion 11. Opening into the housing are a plurality of passageways 14, 15 and 16, which are capable of connection to an external system of piping. The passage 14 is intended to be connected to a source of fluid under pressure, passage 15 for connection with some external apparatus, as for example the cylinder of a hydraulic plunger, which is to be supplied with fluid under pressure, while passage 16 may function simply as a means for exhausting fluid flowing back thru passage 15. Positioned within the valve housing and adapted to control the flow of fluid between the various passages, are the valve members 18 and 19 which are preferably connected together in spaced relationship. Valve member 18 is adapted to cooperate with a valve seat provided upon the internal annular flange 21, while valve member 19 is likewise adapted to cooperate with valve means provided upon a similar flange 22. Each member is preferably constructed to provide both poppet and cylindrical valve portions, for a reason which will be presently explained. The poppet portion of valve 18 is formed by the conical valve surface 23 which cooperates with the conical valve seat 24, while the cylindrical valve portion is formed by the cylindrical surface 26 which cooperates with the cylindrical bore 27 provided in flange 21. Similarly the poppet portion of valve 19 is formed by the conical surface 28 which is adapted to seat upon the conical surface 29 provided upon flange 22, and the cylindrical valve portion is formed by the cylindrical surface 31 which fits snugly within the cylindrical bore 32. In order to permit flow of fluid from passage 14 when the valve member 19 is removed from its seat, valve members 18 and 19 are interconnected by a portion 33 of reduced diameter.

The piston plunger for operating the valve members is preferably directly connected to the same. The particular piston shown has been designated generally at 34 and is formed in part by an upward extension of the valve member 19. It is preferably substantially larger in diameter than the diameter of valve member 18 whereby a differential force will be established when the upper surface of the piston and the lower face of valve member 18 are subjected to pressures of the same order. Piston 34 is slidably fitted within a suitable cylinder 36 which is preferably formed as an inverted cup-shaped member provided with a peripheral flange 37 which is seated within a counterbore 38. Surrounding the cylinder 36 there is an annular space 39 which is in communication with the housing passage 16. Movement of the piston and the valve members is preferably guided by means of a member 40 which is shown as formed integral with the cylinder member 36, and which extends downwardly thru the piston and valve members. A cup washer 35 may be provided for sealing the space between the piston and guide member and another cup washer 41 for sealing the piston with respect to the walls of cylinder 36.

For controlling movements of the piston 34 and the valve members we provide a pilot valve 42 which functions to control application of fluid pressures to the piston 34. This pilot valve extends downwardly thru a passage 43 in guide member 40, and is provided with an extension 44 which terminates exteriorly of the housing. It is provided with two valve members 46 and 47 which cooperate respectively with valve seats 48 and 49. Ports 51 provide communication between passage 43 and the interior of the cylinder 36. Communication is provided between the annular space 39 and the upper end of passage 43 as by means of ports 52 and recess 53.

For convenience in explaining the operation of the valve, that portion of the housing which is in immediate communication with passage 14 has been indicated as chamber A, while the cylinder space above the piston 34 has been designated chamber B. In the position of the valve illustrated fluid from passage 14 is free to flow thru chamber A, around the valve member 18 and out thru the passage 15, while communication between chamber A and passage 16 is interrupted by the valve member 19. If the pilot valve 42 is now actuated externally to close valve member 46 and open valve member 47 fluid is exhausted from the chamber B to the passage 16, by way of ports 51, recess 53, ports 52 and annular space 39. As it is presumed that substantially no back pressure will exist in passage 16, the pressure of fluid flowing between passages 14 and 15 will exert sufficient pressure upon the exposed lower pressure areas of valves 18 and 19 to force the piston 34 upwardly to the upward limit of its movement to close valve member 18 and open member 19. Communication is then interrupted between chamber A and passage 15, but a flow may occur between passages 15 and 16. If pilot valve 42 is again actuated to close valve member 47 and open valve member 46, communication will be established between chamber A and chamber B, thru passage 43 and ports 51. The pressure in chamber B when pressing upon the larger area of plunger 34 will then be sufficient to force piston 34 downwardly to close valve member 19 and again open valve member 18. The function of the cylindrical valve members 26 and 27 and 31 is to restrict direct communication between passages 14 and 16 while the valve members 18 are being moved from one position to another. Thus when the valve members are moved upwardly cylindrical member 26 approaches cylindrical bore 27 as cylindrical valve member 31 leaves its associated bore 32. No attempt need be made to make the cylindrical valve portions fluid tight, since a positive seal is provided by the poppet valve portions 23 and 28.

As little power is required for actuating the pilot valve 42, remote control of the valve may be secured thru a suitable electrical solenoid 56 which is mechanically connected to the pilot valve extension 44 as by means of a motion transmitting lever 57. As the pilot valve 42 is always biased upwardly by virtue of the fluid pressure in chamber A, lever 57 may simply have abutting contact with the end of pilot valve extension 44 as by means of an adjustable pin 58.

We claim:

1. In a device of the class described, a valve housing having at least three passages for flow of fluid thru the housing, a pair of valve members for controlling said flow, a fluid operated plunger disposed within the housing and directly connected to both said valve members, a sleeve mounted stationary relative to said housing and extending through said plunger and valve members, and a two-way pilot valve operatively disposed within said sleeve and operable externally of the housing to control movements of said plunger and valve members.

2. In a device of the character described, a valve housing having at least three passages for flow of fluid, the first of said passages being connected with a source of fluid under pressure, a pair of valve members connected together to move simultaneously, said valve members when in one position serving to permit flow of fluid from the first to the second passage to the exclusion of the third passage, and in another position to permit flow of fluid between said second and third passages to the exclusion of the first, a fluid operated member adapted to actuate said valve members and disposed within the housing, said member having large and small opposed pressure areas, a sleeve mounted within the housing and extending thru said fluid operated member and said valve member, one end of said sleeve being in communication with said first passage and the other end in communication with a chamber completed by said large area, and a pilot valve cooperatively disposed with respect to said sleeve and operable from the exterior of the housing, said valve being operable to subject the larger pressure area to the pressure of fluid in the first passage for effecting movement of the valve members to said one position to permit flow of fluid from the first to the second passage, and operable to exhaust fluid from the larger pressure area while the smaller area is subjected to the pressure of fluid in the first passage whereby movement of the valve members is effected to said other position.

3. In a device of the class described, a housing, upper and lower chambers within the housing connected respectively to a pair of passages in the housing, the passage to the lower chamber being adapted for connection with a source of fluid under pressure, a chamber intermediate said first named chambers communicating with a third passage in the housing, a cylinder disposed in the upper chamber, said cylinder having a lower end open to said upper chamber and a closed upper end, a piston disposed in said cylinder, a pair of valve members carried upon the lower end of said piston, a pair of valve seats cooperating with said valve members for three way control of fluid flow thru said passages, and pilot valve means movable to one position to exhaust fluid from above the piston to said upper chamber and movable to another position to establish communication between the cylinder above the piston and said lower chamber.

In testimony whereof, we have hereunto set our hands.

ERNEST W. ORTON.
CHARLES V. FOULDS.